Figure 3:
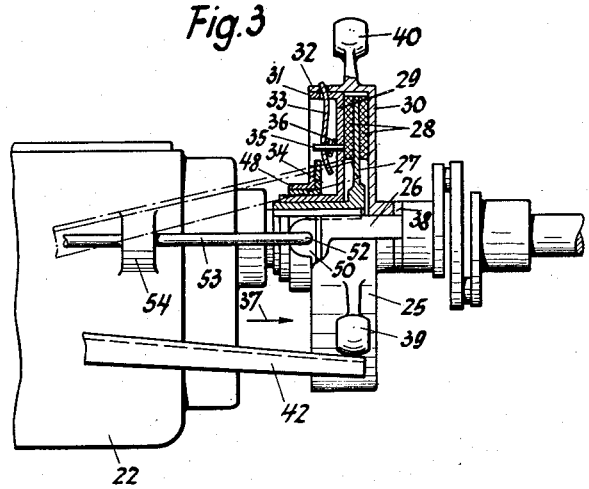

Jan. 25, 1955　　　F. K. H. NALLINGER　　　2,700,438
BRAKING DEVICE, PARTICULARLY FOR MOTOR VEHICLES
Filed Dec. 20, 1950　　　2 Sheets-Sheet 1
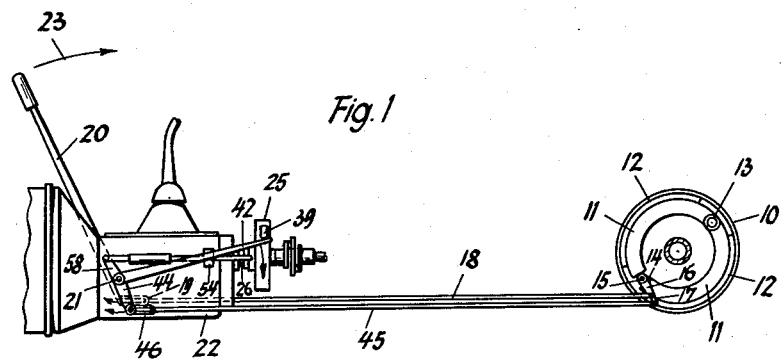
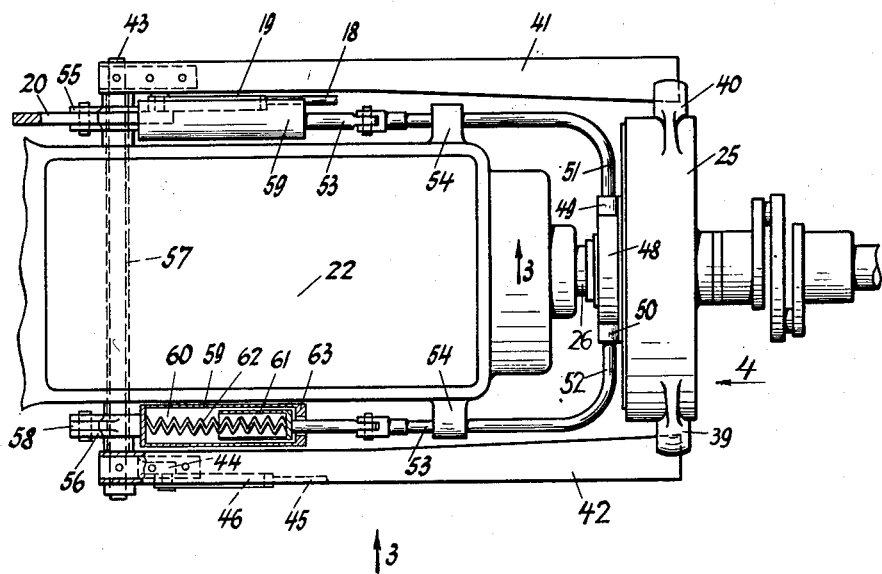
INVENTOR
FRIEDRICH K. H. NALLINGER
BY:
　Nauetin, Lake & Co.
　　　AGENTS Jan. 25, 1955   F. K. H. NALLINGER   2,700,438
BRAKING DEVICE, PARTICULARLY FOR MOTOR VEHICLES
Filed Dec. 20, 1950   2 Sheets-Sheet 2

United States Patent Office 2,700,438
Patented Jan. 25, 1955

2,700,438

BRAKING DEVICE, PARTICULARLY FOR MOTOR VEHICLES

Friedrich K. H. Nallinger, Stuttgart-N, Germany, assignor to Daimler-Benz Aktiengesellschaft, Stuttgart-Unterturkheim, Germany Application December 20, 1950, Serial No. 201,808

3 Claims. (Cl. 188—106)

This invention relates to a braking device particularly for motor vehicles and more particularly to a form of braking device in which a principally mechanical braking force energizer is employed.

An object of the invention is to provide a braking device that renders it possible to obtain an increase in brake actuating force in an especially effective manner principally also for heavy vehicles with large masses to be retarded. Another object of the invention is to provide such a construction for the braking force energizer and brake operating device that the possibility of safe brake operation is also given in the event of energizer failure.

A further object of the invention is to make such a device also utilizable for hand brakes. This was, up till now, considered to be superfluous because the hand brake is usually applied only when the car is left standing and the demands on the construction of its linkage or brake connections make the mounting of a mechanically operated device for energizing the braking force quite difficult. However, experience has proven in the operation of heavy vehicles with correspondingly large proportioned brakes, for example, omnibusses, that in the event of malfunction of their foot brakes frequently it has not been possible to bring the vehicle to a stop within a sufficiently short time solely with the hand brake, because the physical strength of the operator does not suffice to produce, with direct force transmission from hand-brake lever to the brake shaft, a moment on the latter corresponding to the full capacity of the brakes.

Accordingly, another object of the invention is to provide such brake actuating whereby normally, while cutting out direct brake operation by means of the operating device, for example, a hand lever, the brake is applied by the energizer, however, means being provided also at the same time for actuating the brake directly by means of the operating device while by-passing the energizer.

Consequently an object of the invention consists principally in certain details of construction providing for a combination of the following features:

(a) The brake operating member, for example, a hand-brake lever is connected directly with the brake or brakes by means of preferably mechanical transmission means which comprise a free-motion device e. g. in the form of a slotted-link so as to permit other brake operation.

(b) The brake actuating member is connected with the device for engaging the energizer or servo-motor by means of preferably mechanical transmission means appropriately adapted to be yielding by employing a spring under initial tension by means of a stop.

(c) The driven part of the braking force energizer is connected with the brake or brakes by means of preferably mechanical transmission means comprising a free-motion device e. g. in the form of a slotted-link permitting direct actuating of the brake or brakes.

Other objects and advantages of the invention will be brought out during the following description of several embodiments of the invention which have been chosen to illustrate the features, principles and advantages thereof.

Figure 4:
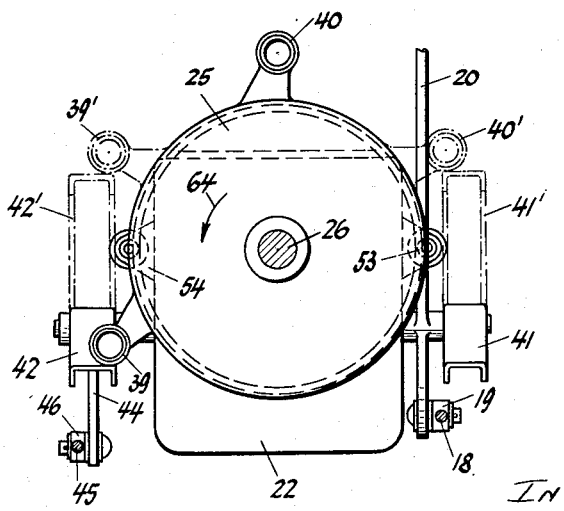

Referring to the drawings:

Fig. 1 is a simplified illustration of a brake system employing the features of the invention showing the parts in side view, Fig. 2 is an enlarged top plan view illustrating the arrangement of the braking force energizer and associated parts, Fig. 3 is a side view of the energizer with a fragmentary sectional view in the plane of the line 3—3 in Fig. 2, Fig. 4 is a rear view in the direction of the arrow 4 in Fig. 2.

In the illustrated construction according to this invention, the hand brake is effective exclusively upon the rear wheels of the vehicle, each of which is provided with a brake drum 10 against whose interior surface two brake shoes 11 are pressed with their brake lining 12 when the vehicle is to be decelerated. For this purpose the brake shoes, pivotally disposed on a pin 13, are caused to expand by means of a brake actuating cam 14. The brake actuating cams of both rear wheels are situated on a mutual brake shaft 15 on which are also rigidly secured two levers 16 and 17 at some distance from each other. The lever 16 is connected to a pull rod 18 which is linked with its forward end to the lower end of the double hand-brake lever 20 by means of a slotted-link 19. The hand-brake lever is fulcrumed at 21 to the transmission housing 22. By moving the hand-brake lever in the direction of the arrow 23 the brakes are applied on the two rear wheels, at the same time the hand lever may be locked in any position by means of a conventional pawl and ratchet device (not shown). The slotted-link 19 ensures that the brake may also be operated from another point independently of the position of the hand-brake lever.

This operation from another point may in the present instance be actuated just as well by the brake system (not shown here) being effective upon all the road wheels as also by the braking force energizer 25. The latter is situated directly in the rear of the transmission housing 22 on the transmission main shaft 26 and is essentially a friction clutch which by means of the hand-brake lever 20 may be let in or thrown out in a manner hereinafter more fully described. The energizer 25 consists of a driving disk 27 splined upon the transmission shaft 26 and two driven disks 29 and 30 movably disposed on the shaft 26 and provided with friction linings 28. These disks 29 and 30 are so arranged that they fit into each other at their cylindrical marginal extremities and may be moved axially against each other and against the driving disk by means of finger levers 33. The outer extremities of these finger levers engage registering slots on the cylindrical margins 31, 32 and with their inner extremities they are supported on a thrust collar 34 axially shiftable on the hub of the driven disk 29. The inner extremity of each lever is, moreover, also guided on the driven disk 29 by a pin 35 and held spaced therefrom by a coil spring 36 so long as no external forces are exerted upon the lever.

As clearly shown on the drawing, the effective length of the lever with which the finger levers engage the cylindrical margins 31, 32 of the driven disks is much smaller than that with which the thrust collar 34 acts upon the inner extremities of the levers. The first corresponds approximately to the sum of the thickness of the walls of both margins. Consequently, a moderate pressure exerted upon the collar 34 in the direction of the arrow 37 will be sufficient to push both disks 29, 30 with their frictional lining 28 against the driving disk 27 with great force, so that the same makes the effort to engage the disks 29, 30 with a corresponding torque. Accordingly, a multiplication of the control force exerted upon the thrust collar 34 takes place in the energizer 25. At the same time a substantial interior compensation of the contact pressures takes place as a consequence of the described structure of the energizer. Thus the control force exerted upon the thrust collar appears as an axial reaction force on the outside which may be taken up in a relatively simple way by a self-lubricating graphite ring 38.

In order to utilize the torque exerted upon the disks 29, 30 as brake actuating moment, it is transmitted in each rotational direction by means of one of the eyes 39, 40 disposed on the disk 30 to one of the two levers 41, 42 which are fastened on a mutual shaft 43 passing through and being rotatably supported in the transmission housing 22. The one lever 42 is shaped as a bell-crank to the short leg 44 of which is linked the pull rod 45 by means of a slotted-link 46 and the pull rod 45 is connected to the lever 17 of the brake shaft 15. Also in this case the purpose of the free-motion device (slotted-link) is to permit other actuation when the energizer is inoperative.

In order to exert the axial control force upon the thrust collar 34, the same is connected to the hand-brake lever 20 as follows: A second thrust collar 48 likewise of angular cross-section is supported on the thrust collar 34. In the eyes 49, 50 of this second thrust collar are fastened the ends 51, 52 (inwardly bent at right angles) of a double linkage 53 which is longitudinally shiftable in the lugs 54 on the transmission housing and whose other ends 55, 56 are linked respectively to the hand-brake lever 20 and to a control lever 58 fastened together with the hand-brake lever on a mutual tubular shaft 57. On both sides of the transmission housing a force limiter 59 each is connected to the control linkage. This limiter comprises a cylinder 60 in which a piston 61 is pressed steadily against the cylinder top 63 by means of a spring 62 under initial tension so long as no external forces exceeding the spring force act upon it.

Upon moving the hand-brake lever 20 and therewith also the control lever 58 in the direction of the arrow 23 a force conforming to the initial tension of the springs 62 is exerted upon the thrust collar 34. Movement of the thrust collar 34 in axial direction engages the energizer 25 and due to the relatively great length of the springs 62 this changes the action of the springs 62 only to a very small extent even upon further movement of the levers 20, 58. Consequently, the hand of the driver when applying the hand-brake experiences only a relatively slight counter pressure which is almost constant through the entire travel of the hand-brake lever and which by means of the energizer and by means of the long levers 41, 42 is converted to a brake actuating force of considerable quantity, however, on the other hand permitting application of the brake directly by way of the lower end of the hand-brake lever 20 and pull rod 18 without great additional resistance, if the energizer should not work for any reason whatsoever. In Figs. 1 and 2 the brake is illustrated in its position of rest, whereas Figs. 3 and 4 illustrate the energizer in the braking position conforming to a direction of rotation of the drive shaft 26 as indicated by the arrow 64.

The invention is not limited or restricted to the specific embodiments illustrated and described herein but may be varied within the scope of the individual inventive concepts.

What is claimed is:

1. In a motor vehicle, a hand brake lever, a driving device, a mechanical brake energizer comprising a driving disc secured on a rotating shaft of said driving device and a frictional member rotatable and slideable on said rotating shaft, first means for moving said frictional member into and out of contact with said driving disc, a linkage connecting said first means with said hand brake lever, said linkage being formed of two parts each comprising a stop member and a spring interposed between said two stop members for limiting the force to be transmitted by said linkage, second means connecting said hand brake lever with the brakes of the vehicle for directly actuating said brakes, and third means connecting said frictional member with the brakes of the vehicle for actuating said brakes from said brake energizer, said brake energizer further comprising two frictional members positioned on either side of said first named frictional member and loosely and rotatably disposed relative to the latter though coupled with each other in rotational direction, an actuating mechanism operatively connected to said two frictional members to bring them into coupling engagement with said first named frictional member, and a shoulder extending from one of said two last named frictional members to be engaged by the means for operating said brake from said brake energizer when said frictional members are engaged by said first named frictional member in rotational direction of said driving device thereby to operate said brake.

2. In a motor vehicle a driving device, a brake, a brake energizer comprising a friction member movable a limited amount in either direction of rotation, means for actuating said brake energizer from said driving device for rotating said energizer in one or the other rotational direction, two abutment members on said friction member, two levers, one of said levers cooperating with one of said abutment members in one rotational direction of said brake energizer and the other one of said levers cooperating with said other abutment member of said braking force energizer in the other rotational direction, and means for transmitting the leverage to said brake for actuating the same.

3. In a motor vehicle, a hand brake lever, a driving device, a mechanical brake energizer comprising a driving disc secured on a rotating shaft of said driving device and a frictional member rotatable and slideable on said rotating shaft, first means for moving said frictional member into and out of contact with said driving disc, a linkage connecting said first means with said hand brake lever, said linkage being formed of two parts each comprising a stop member and a spring interposed between said two stop members for limiting the force to be transmitted by said linkage, second means connecting said hand brake lever with the brakes of the vehicle for directly actuating said brakes, and third means connecting said frictional member with the brakes of the vehicle for actuating said brakes from said brake energizer, wherein said first means comprise a shaft for said hand brake lever, two further levers disposed on said shaft, an operating member for said brake energizer, two linkages for connecting said levers with said hand brake lever, and a spring-loaded device interposed in each of said linkages for limiting the forces to be transmitted by said linkages.

References Cited in the file of this patent

UNITED STATES PATENTS

| Number | Name | Date |
|---|---|---|
| 1,465,066 | Stringer | Aug. 14, 1923 |
| 1,592,715 | Birkigt | July 13, 1926 |
| 1,636,852 | Collins | July 26, 1927 |
| 1,743,367 | Maybach | Jan. 14, 1930 |
| 1,827,104 | Perrot | Oct. 13, 1931 |
| 1,883,317 | Ragan | Oct. 18, 1932 |
| 2,052,551 | Browne | Sept. 1, 1936 |
| 2,071,636 | La Brie | Feb. 23, 1937 |
| 2,074,715 | Axtmann | Mar. 23, 1937 |

FOREIGN PATENTS

| Number | Country | Date |
|---|---|---|
| 116,291 | Sweden | Apr. 23, 1946 |